(12) United States Patent
Aronsen et al.

(10) Patent No.: US 8,637,134 B1
(45) Date of Patent: Jan. 28, 2014

(54) VENTED PLASTIC FILM AND METHOD OF MAKING

(75) Inventors: Arthur Norman Aronsen, Orinda, CA (US); Jaime Nelson Barfield, Castro Valley, CA (US); Luis Arturo Lopez, Mountain View, CA (US); Jason Zhao, Fremont, CA (US)

(73) Assignee: Alliance Plastics, LLC, Rock Hill, SC (US)

( * ) Notice: Subject to any disclaimer, the term of this patent is extended or adjusted under 35 U.S.C. 154(b) by 533 days.

(21) Appl. No.: 12/660,370

(22) Filed: Feb. 25, 2010

Related U.S. Application Data

(60) Provisional application No. 61/210,769, filed on Mar. 23, 2009.

(51) Int. Cl.
*B32B 3/24* (2006.01)
*B32B 5/08* (2006.01)
*B32B 38/04* (2006.01)

(52) U.S. Cl.
USPC ........... 428/137; 428/138; 428/114; 156/148; 156/176; 156/167; 156/265

(58) Field of Classification Search
USPC .......... 428/137, 138, 114; 156/148, 176, 167, 156/265
See application file for complete search history.

(56) References Cited

U.S. PATENT DOCUMENTS 8,080,304 B2 * 12/2011 Clarke ........................ 428/137
2005/0123721 A1   6/2005 Heikaus et al.
2008/0280098 A1  11/2008 Papadopoulos et al.

FOREIGN PATENT DOCUMENTS

EP            909721 A1 *   4/1999

* cited by examiner

*Primary Examiner* — William P Watkins, III
(74) *Attorney, Agent, or Firm* — Hammer & Associates, P.C.

(57) ABSTRACT

Vented plastic stretch film and a method of making the film in which elongated reinforcement strips are applied to a base sheet, each reinforcement strip including a cord-like, reinforcement member formed from plastic film and a flat, narrow film strip covering the reinforcement member. Vent holes are formed from slits between the reinforcement members by applying tensional forces to the base sheet.

6 Claims, 3 Drawing Sheets

VENTED PLASTIC FILM AND METHOD OF MAKING

This application is based on and claims the benefit of U.S. Provisional Patent Application No. 61/210,769, filed Mar. 23, 2009.

TECHNICAL FIELD

This invention relates to a method for producing plastic film, more particularly vented plastic film and even more particularly vented stretch film employed in pallet wrapping and other applications. The invention also encompasses the plastic film. Certain aspects of the invention are applicable to non-vented, non-stretch film.

BACKGROUND OF THE INVENTION

Vented stretch films are well known and such films are commonly employed, for example, to wrap goods and products of various types positioned on a pallet, the film wholly or partially covering the goods or products and also typically applied to the pallet itself to secure the pallet to the items positioned thereon. Vents in the nature of preformed openings in the film provide air circulation, the films themselves typically being polyethylene, although other stretch film sheet materials can be employed as well.

U.S. Patent Application Publication No. US 2005/0123721, published Jun. 9, 2005, illustrates a stretch film for the packing of goods, particularly for the packing of goods stacked on a pallet, the stretch film comprising a prestretched main film reinforced by reinforcement strips extending in the longitudinal direction. The reinforcement strips are made from film strips of prestretched film which have been folded a plurality of times in the longitudinal direction. Two mutually staggered rolls of preformed holes are formed in the main film between adjacent reinforcement strips. The holes are formed in the main film by perforating rollers, one roller having cylindrical protrusions and the other roller having cylindrical recesses of corresponding shape. One or both of the perforating rollers are heated so that the holes are molded into the main film and not generated by punching. Alternatively, a single perforating roller with protrusions may be utilized to form holes. The holes may be round, oval or elliptic shape.

U.S. Patent Application Publication No. US2008/0280098, filed Nov. 13, 2008, discloses a stretch film comprising a base film made of a stretchable plastic film material, a multiplicity of holes in the base film arranged in several columns along a main direction, and at least one reinforcement strip made of a stretchable plastic film material. The reinforcement strip is arranged and fixed on the base film in an area between two adjacent columns of holes. The thickness of the base film is greater than or equal to the thickness of the reinforcement strip and the width of the reinforcement strip is as great as possible, but is such that the reinforcement strip does not contact or overlap the holes in the adjacent columns of holes. The reinforcement strip may be fixed to the base film so as to be inseparable and indistinguishable from the base film.

DISCLOSURE OF INVENTION

The present invention encompasses a vented stretch film of unique structure which is high strength and provides excellent air circulation as opposed to conventional single sheet vented stretched films, which can break frequently and provide poor pallet wrapping integrity. The vented stretch film of this invention provides excellent strength in pallet wrapping or other applications even when stretched up to 250 percent or more. The vented stretch film is useful in the pallet wrapping of a wide variety of products and goods including produce, flowers, hot items, cold items and virtually any other product where strength and stability of the pallet and load is desired along with good air circulation.

Larger holes may be employed than is the case with conventional vented stretch films and no film waste takes place during production of the vented stretch film. The configuration, size and pattern of the vent holes can be readily changed.

According to the method of the invention, an elongated moving base sheet of plastic stretch film has applied thereto in the longitudinal direction a plurality of elongated reinforcement strips, each reinforcement strip having a cord-like, elongated reinforcement member formed by compressing or twisting a band of film stock and a flat, narrow plastic film strip. The spaced reinforcement strips are attached to the elongated base sheet, extend along the longitudinal axis of the elongated base sheet, are disposed substantially parallel to each other, and define spaces therebetween.

In the spaces between these reinforcement strips, spaced slits are formed in the base sheet, the slits extending transversely to the direction of the base sheet movement.

Tensional forces are applied to the base sheet to stretch the slits, the slits normally being centered between adjacent reinforcement strips. Application of these tensional forces changes the slits to vent holes without destroying the reinforcement strips, the length of the slits and the amount of stretching determining the final size of the vent holes. The reinforcement strips limit the maximum size of the vent holes while continuing to provide reinforcement and strength to the vented stretch film.

The invention also encompasses a vented plastic film produced by the method.

Other features, advantages and objects of the present invention will become apparent with reference to the following description and accompanying drawings.

BEST MODE FOR CARRYING OUT THE INVENTION

Figure 1:
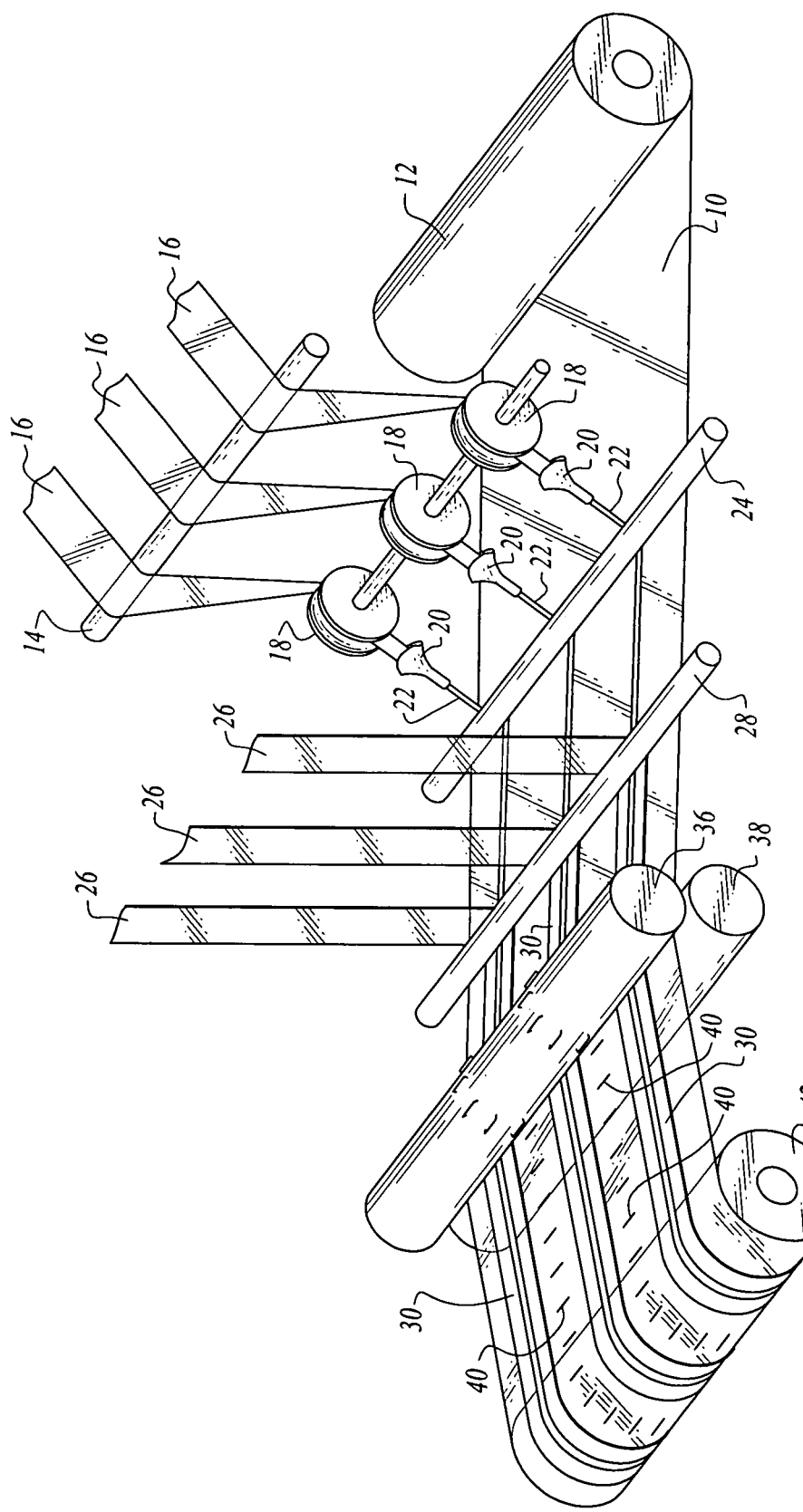
FIG. 1 is a schematic, perspective view of apparatus carrying out the method of the present invention when manufacturing the vented plastic stretch film of the invention.

FIG. 1 shows a base sheet of stretch film 10, which may for example suitably may be polyethylene stretch film, being unrolled from a roll 12 of the film and conveyed toward the left as viewed in FIG. 1.

Disposed over the base sheet 10 is a guide roller 14. Narrow plastic film strips 16, also formed of polyethylene or other suitable material, are shown being conveyed over the guide roller and downwardly to rotating collector rolls 18. The film strips 16 are partially compressed in random fashion by collector rolls 18. The randomly compressed strips are then introduced into compressor nozzles 20 for further random compression and possible twisting and emerge therefrom as cord-like, elongated reinforcement members 22. Reinforcement members 22 are pushed against the upper surface of base sheet 10 by an idler roll 24.

Immediately thereafter, flat, narrow plastic film strips 26 which also may suitably be polyethylene, are applied to the base sheet, laid over and covering the reinforcement members 22, the strips 26 on and in engagement with the elongated base sheet on opposed sides of reinforcement members 22. An idler roll 28 is employed for such purpose and also to establish a firm interconnection between the base sheet 10, the reinforcement members 22 and the narrow film strip overlays 26.

The reinforcement members 22 and the narrow film strips 26 form three elongated reinforcement strips 30 in the arrangement illustrated. The reinforcement strips are attached to the base stretch film by any suitable expedient, such as static charge, adhesive or heat bonding, for example. The reinforcement strips 30 are spaced from one another and extend along the longitudinal axis of the elongated base sheet. The reinforcement strips are parallel to each other and define spaces therebetween.

After passing under idler roll 28, the base stretch film 10 and the attached reinforcement strips 30 pass between a die roll 36 and an anvil roll 38. These rolls 36, 38 form spaced cuts or slits 40. The slits are centered between the reinforcement strips and extend in a direction transverse to the direction of movement of the base sheet, that is, a direction corresponding to the longitudinal axis of the elongated base sheet 10. The distance between each slit in each roll thereof can be varied as desired. The slits may be of different lengths for different applications. Preferably, the slits are no more than one inch in length in most applications to provide the ability for the film to separate in a controlled manner during a later process of stretching, to be described below. The formed vented stretch film is now wound into a roll 42 in this embodiment of the invention.

Figure 2:
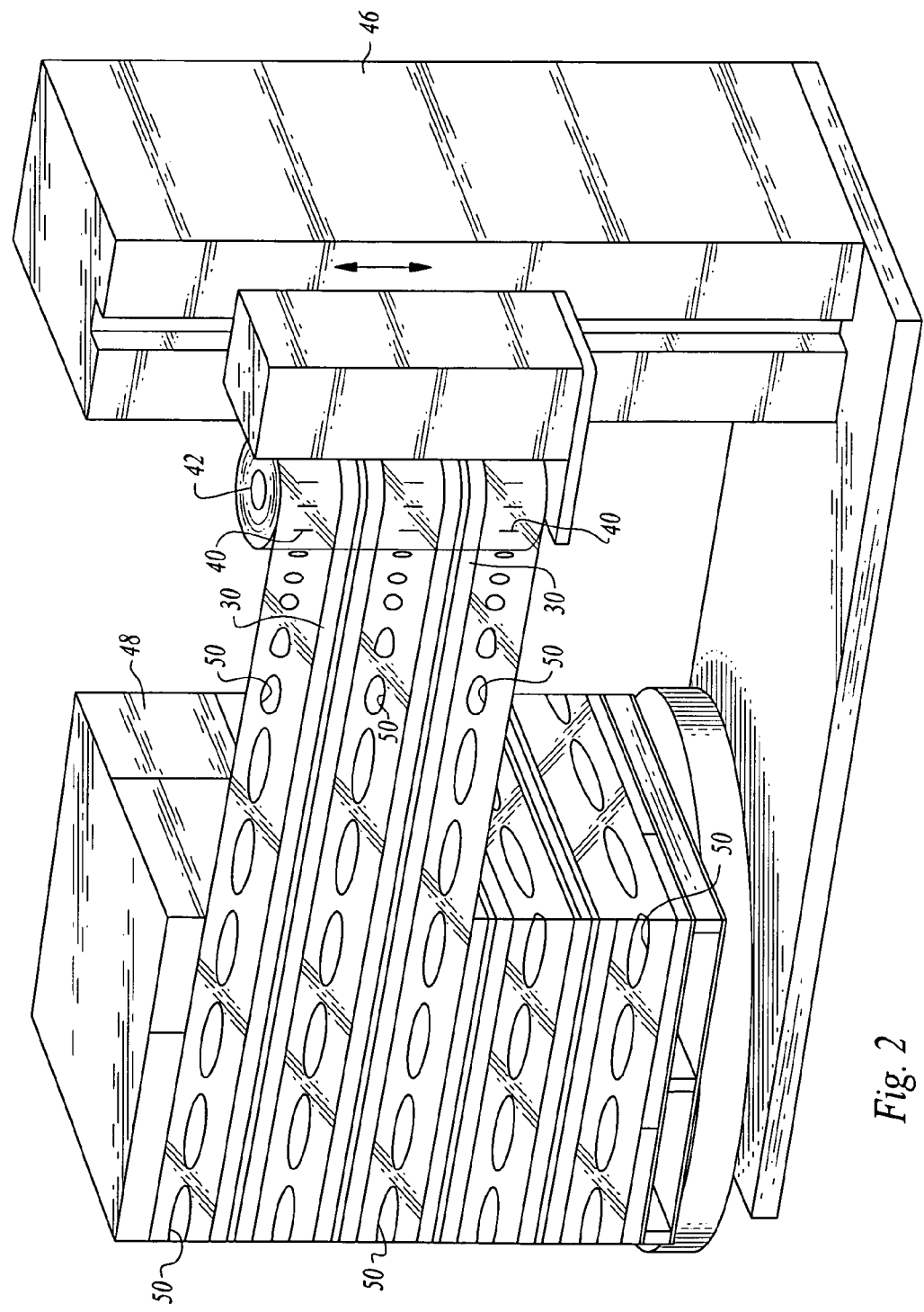
FIG. 2 is a schematic, perspective view showing the vented plastic stretch film being used to wrap a pallet and pallet load through use of a stretch wrapping machine, stretching of the vented plastic stretch film causing vent holes to be formed from the slits during operation of the stretch wrapping machine.

FIG. 2 illustrates a roll 42 of the vented plastic stretch film being held by a conventional stretch film wrapping machine 46 which may, for example, be a suitable model of stretch film wrapping machine made by Lantech of Louisville, Ky. The stretch film wrapping machine is shown wrapping the vented stretch film of the present invention about a pallet load 48.

Figure 3:
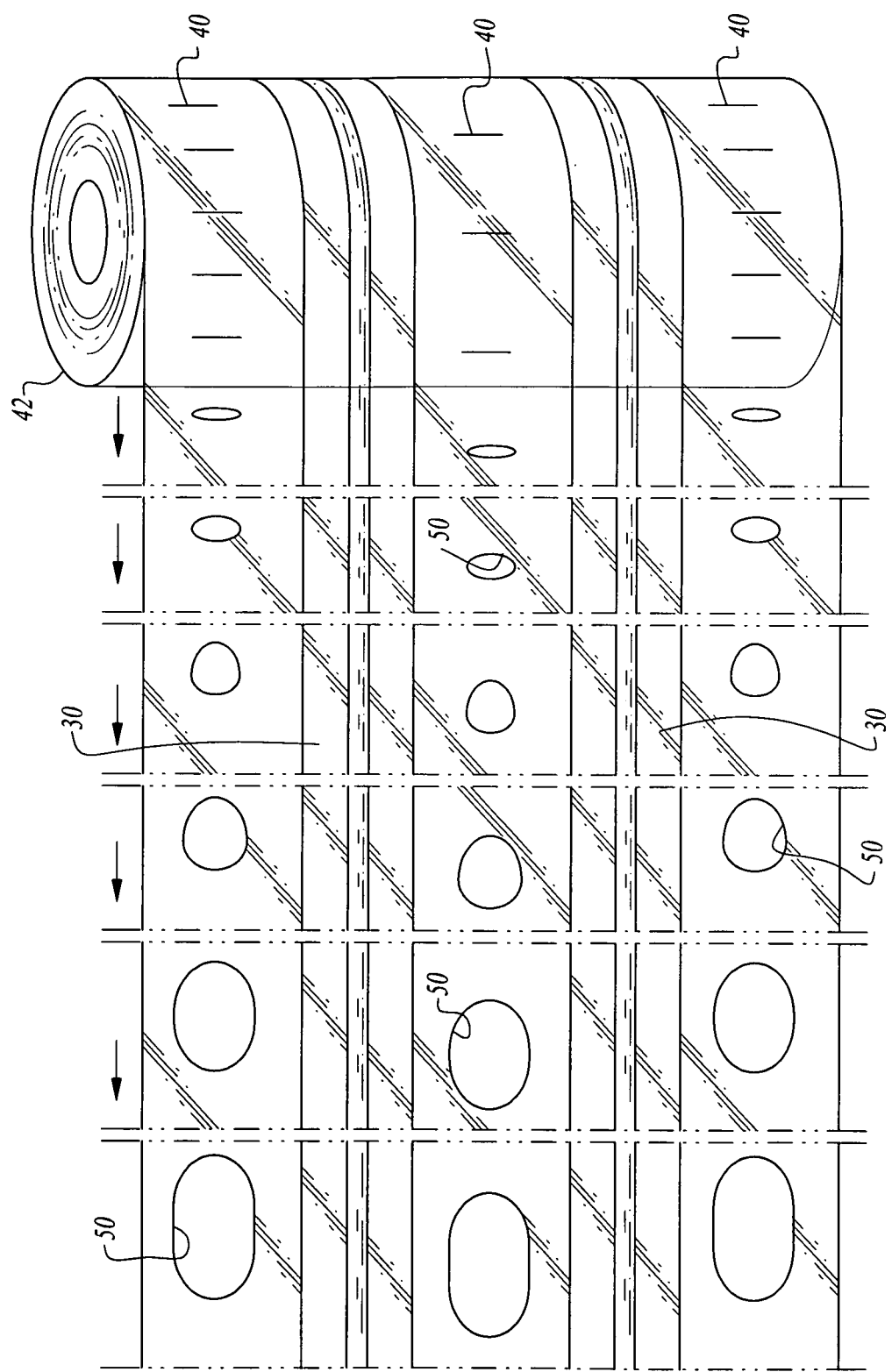
FIG. 3 is a schematic, plan view illustrating formation of the holes from the slits at sequential stages of the stretch process.

During stretch film wrapping, pulling or tensional forces are applied to the base sheet 10 of stretch film. In the stretch film of the present invention, these forces cause the slits 40 to expand both lengthwise and widthwise to create open vent holes 50. The size of these vent holes is limited by the location of the elongated reinforcement strips 30. The size of the holes 50 can be varied by changing the tensional forces exerted on the film and/or the time period between exit of the vented plastic stretch film from the supply roll 42 to the point of application; and of course, slit length changes result in hole size changes. FIG. 3 provides an illustration of how the holes 50 change shape during stretching of the base sheet, more particularly in this instance, during the stretch wrap process.

It will be appreciated that the stretching step need not be carried out at the location where wrapping takes place. Changing the slits 40 to holes 50 can take place in line with the other operations illustrated in FIG. 1 and described above. That is, suitable means may be provided to subject the stretch film to pulling or tensional forces sufficient to cause a transformation from slit 40 to open vent hole between the nip of the anvil and die rolls and roll 42. The conversion between slit and hole can be accomplished at a completely different station and location.

With this approach hole sizes may be readily changed in accordance with the wishes of a customer. Other suitable custom changes to the vented plastic stretch film can also be made. For example, the reinforcement strips or the components thereof may be coded by color or in some other manner for a particular application or customer. Also, the reinforcement strips can carry trademarks or other suitable indicia.

The invention claimed is:

1. A method of producing vented plastic stretch film, said method including the steps of:

providing an elongated base sheet of plastic stretch film having a longitudinal axis;

transporting the elongated base sheet in a direction of movement corresponding to the longitudinal axis of said elongated base sheet;

simultaneously with the transport of said elongated base sheet, forming a plurality of cord-like, elongated reinforcement members, where each of said cord-like, elongated reinforcement members is made by simultaneously randomly compressing a transported flat, narrow plastic film strip by randomly compressing said flat, narrow plastic film strip by rotating a collector roll and employing a compressor nozzle during transport thereof;

during transport of said elongated base sheet, attaching said plurality of cord-like, elongated reinforcement members to said elongated base sheet, said cord-like, elongated reinforcement members extending along the longitudinal axis of said elongated base sheet, spaced from one another and disposed substantially parallel to one another;

transporting said elongated base sheet and said cord-like, elongated reinforcement members attached thereto in the direction of movement to the longitudinal axis of said elongated base sheet;

during transport of said elongated base sheet and said cord-like, elongated reinforcement members attached thereto, positioning a narrow plastic film strip overlay over each of said cord-like, elongated reinforcement members, said narrow plastic film strip overlays being parallel and spaced from one another;

attaching said narrow plastic film strip overlays to said cord-like, elongated reinforcement members and to said elongated base sheet to fixedly sandwich said cord-like, elongated reinforcement members between said elongated base sheet and said narrow plastic film strip overlays, said narrow plastic film strip overlays and said cord-like, elongated reinforcement members comprising parallel, elongated reinforcement strips defining elongated spaces therebetween, said base sheet being uncovered in said elongated spaces; and during transport of said elongated base sheet and said elongated reinforcement strips, forming a plurality of slits in said elongated base sheet in the elongated spaces defined by said elongated reinforcement strips and applying tensional forces to said base sheet to stretch said elongated base sheet and expand and open said slits to form vent holes therefrom, said elongated reinforcement strips operable to restrict formation of said vent holes to the spaces defined thereby.

2. The method according to claim 1 wherein said slits are substantially centered in the spaces defined by said elongated reinforcement strips.

3. The method according to claim 1 wherein said slits are separated from one another and oriented transversely relative to the longitudinal axis of the elongated base sheet and to the elongated reinforcement strips.

4. The method according to claim 1 wherein the step of forming a plurality of vent holes includes applying tensional forces to said base sheet to stretch said base sheet and expand and open said slits for form the vent holes when said vented plastic stretch film is being stretch wrapped about one or more objects.

5. The vented plastic stretch film obtained by the method of claim 1.

6. Vented plastic stretch film including, in combination:
an elongated base sheet of plastic stretch film having a longitudinal axis; and
a plurality of elongated reinforcement strips, each elongated reinforcement strip including a cord-like, elongated reinforcement member comprising a randomly compressed flat, narrow plastic film strip attached to said elongated base sheet and extending along the longitudinal axis of said elongated base sheet, the cord-like, elongated reinforcement members of the plurality of elongated reinforcement strips being spaced from one another and parallel, each said elongated reinforcement strip further including a narrow plastic film strip over the cord-like, elongated reinforcement member thereof, said narrow plastic film strip being attached to the cord-like, elongated reinforcement member and to the elongated base sheet at opposed sides of said cord-like, elongated reinforcement member to fixedly sandwich the cord-like, elongated reinforcement member between the elongated base sheet and narrow plastic film strip, said elongated reinforcement strips extending along the longitudinal axis of said elongated base sheet, disposed substantially parallel to one another, and defining elongated spaces therebetween, said base sheet being uncovered in said elongated spaces and defining a plurality of slits in said elongated spaces, said elongated reinforcement strips operable to prevent enlargement of said slits beyond the spaces defined thereby.

* * * * *